(No Model.)
E. P. H. CAPRON.
FRICTION CLUTCH.
No. 275,466. Patented Apr. 10, 1883.
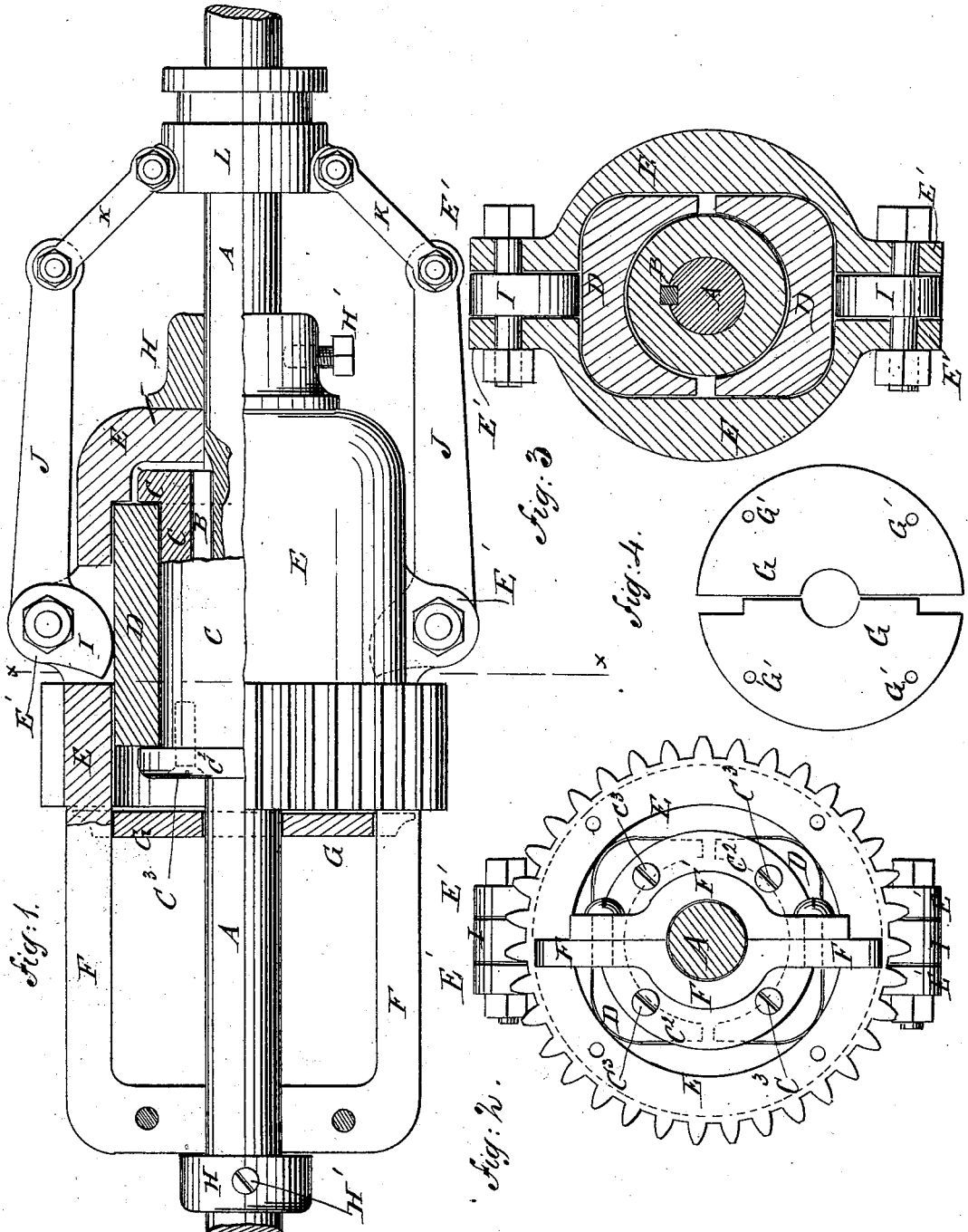

UNITED STATES PATENT OFFICE.

ELISHA P. H. CAPRON, OF HUDSON, NEW YORK.

FRICTION-CLUTCH.

SPECIFICATION forming part of Letters Patent No. 275,466, dated April 10, 1883.

Application filed August 17, 1882. (No model.)

*To all whom it may concern:*

Be it known that I, ELISHA P. H. CAPRON, of Hudson, in the county of Columbia and State of New York, have invented a new and useful Improvement in Friction-Clutches, of which the following is a full, clear, and exact description.

Reference is to be had to the accompanying drawings, forming a part of this specification, in which similar letters of reference indicate corresponding parts in all the figures.

Figure 1 is a side elevation, partly in section, of my improvement. Fig. 2 is an end elevation of the same, showing the shaft in cross-section. Fig. 3 is a sectional end elevation of the same, taken through the line $xx$, Fig. 1. Fig. 4 is a plan view of a detachable collar-bearing.

The object of this invention is to facilitate the locking of pulleys and other wheels upon their shafts and releasing them therefrom, and also to prevent the shafts from being cut or worn by the clutches.

The invention consists in a friction-clutch constructed with a bushing keyed to the shaft within a recessed hub to form a seat for the friction-blocks, also placed within the recessed hub of the loose wheel or pulley, and which are pressed inward against the said bushing by cams operated by levers connected with a collar sliding upon the shaft, whereby the cutting or wear of the shaft will be prevented and the friction will be applied with an advantage of leverage.

Upon the recessed end of the loose pulley or wheel hub is formed a U-bar having a half-bearing in its middle part, and provided with a separable half-bearing loose upon the shaft, whereby the end bearing of the hub will be placed at such a distance from the said hub as will allow the friction-blocks to be readily inserted and removed, as will be hereinafter fully described, and pointed out in the claims.

A represents a shaft, to which is secured, by a key, B, a bushing, C. The bushing C has a flange, C', formed around it at one end, and at its other end is provided with a flange-collar, $C^2$, secured to it by screw-bolts $C^3$. Upon the opposite sides of the bushing C are placed bearing-blocks D, which are made of such a length as to fit between the flanges C' $C^2$ of the bushing C, and are concaved upon their inner sides to fit upon the said bushing in such a manner that a space will be left between their adjacent edges, as shown in Fig. 3, to take up the wear.

E is the hub of the loose wheel or pulley, to be connected with the shaft A by friction-blocks, and which is cored out or recessed from one end, so that it can be slipped over the flanged bushing C and the bearing-blocks D, a sufficient thickness of metal being left at the other end to serve as a bearing. The bearing-blocks D are made with flat sides and rounded corners, or of some form other than circular, and the recess in the hub E is correspondingly shaped to prevent the said bearing-blocks from turning in their seats.

Upon the cored end of the hub E is formed a U-shaped bar or spider, F, loose upon the shaft, and having a half-bearing in its middle part to receive the shaft A, and to which is secured a separate half-bearing, F'. The arms of the spider F are made of sufficient length to allow the bearing-blocks D to be put in and taken out between its middle part and the end of the hub E. The cored or recessed end of the hub E is closed by a collar, G, secured to it by screw-bolts G', and which is made in two parts, as shown in Fig. 4, so that it can be readily applied and removed when desired. In some cases the spider or bearing-bar F can be omitted and the collar G used as a bearing for the end of the hub. The loose pulley or wheel is kept from longitudinal movement upon the shaft A by collars H, placed upon the said shaft, and secured in place by set-screws H'. In the opposite sides of the hub E, and opposite the middle parts of the friction-blocks D, are formed short slots to receive the cams I, formed upon the ends of the levers J, and which are pivoted to and between lugs E' at the opposite sides of its slots. To the other ends of the levers J are pivoted the ends of short connecting-bars K, the other ends of which are pivoted to lugs formed upon the opposite sides of the sliding collar L, placed upon the shaft A, and provided with the usual groove to receive the ordinary clutch-lever. With this construction, when the collar L is moved toward the hub E, the cams I will press the bearing-blocks D against the bushing C, and thus lock the loose pulley or wheel securely to the shaft. The cams I will be withdrawn from the bearing-blocks D by moving the collar L from the hub E.

By using the bushing C, rigidly connected with the shaft A, the friction is applied at such a distance from the axis of the said shaft as will give a great advantage of leverage, so that a comparatively small amount of power will be required to apply and release the clutch.

Another advantage of my improvement is that the shaft will not be cut or worn, the friction being applied to the bushing C, which can be replaced, when worn, at a small cost.

Having thus described my invention, I claim as new and desire to secure by Letters Patent—

1. A friction-clutch constructed substantially as herein shown and described, and consisting of the bushing keyed to the shaft, and provided with end flanges and friction-blocks fitting upon the bushing, placed in a recess in the hub of the pulley or wheel, and pressed inward by cams operated by levers connected with a collar sliding upon the shaft, as set forth.

2. In a friction-clutch, the combination, with the slotted and recessed hub E of the loose pulley, the flanged bushing C, and the bearing-blocks D, fitting in the recess of said hub, of cams I, the levers J, the connecting-rods K, and the sliding collar L, substantially as and for the purpose set forth.

3. In a friction-clutch, the combination, with the recessed hub E of the pulley or wheel, of the U-bar F, having a half-bearing in its middle part, and the separable half-bearing F', substantially as herein shown and described, whereby the end bearing of the hub will be placed at such a distance from the said hub as will allow the friction-blocks to be readily inserted and removed, as set forth.

ELISHA P. H. CAPRON.

Witnesses:
JAMES T. GRAHAM,
C. SEDGWICK.